United States Patent
Winkler

(10) Patent No.: US 8,629,573 B2
(45) Date of Patent: Jan. 14, 2014

(54) ON-BOARD ELECTRICAL SYSTEM FOR A MOTOR VEHICLE, MOTOR VEHICLE AND METHOD FOR OPERATING AN ON-BOARD ELECTRICAL SYSTEM

(75) Inventor: Josef Winkler, Kipfenberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/699,560

(22) PCT Filed: Mar. 2, 2011

(86) PCT No.: PCT/EP2011/001015
§ 371 (c)(1),
(2), (4) Date: Nov. 21, 2012

(87) PCT Pub. No.: WO2011/147493
PCT Pub. Date: Dec. 1, 2011

(65) Prior Publication Data
US 2013/0062940 A1    Mar. 14, 2013

(30) Foreign Application Priority Data

May 25, 2010 (DE) .......................... 10 2010 021 403

(51) Int. Cl.
*B60L 1/00* (2006.01)
*B60L 3/00* (2006.01)
*H02G 3/00* (2006.01)

(52) U.S. Cl.
USPC ........................................................ 307/10.1

(58) Field of Classification Search
USPC ................. 307/9.1, 10.1; 180/65.24
See application file for complete search history.

(56) References Cited

U.S. PATENT DOCUMENTS

2007/0096564 A1   5/2007  Maeda
2008/0238194 A1 * 10/2008  Treguer ........................ 307/10.1

FOREIGN PATENT DOCUMENTS

| DE | 198 59 036 A1 | 6/2000 |
| DE | 10 2005 015 995 A1 | 10/2006 |
| DE | 10 2005 042 154 A1 | 4/2007 |
| DE | 10 2006 010 713 A1 | 9/2007 |
| DE | 10 2007 017 187 A1 | 10/2008 |
| DE | 10 2007 026 164 A1 | 12/2008 |
| DE | 10 2008 002 177 A1 | 12/2009 |

(Continued)

OTHER PUBLICATIONS

Kuenftige Bordnetze (future on-board electrical systems) in "Autoelektrik Autoelektrik", Oct. 2002, Robert Bosch GmbH, Stuttgart (DE), XP002655208, ISBN: 3-528-13872-6, p. 16-19.

(Continued)

*Primary Examiner* — Carlos Amaya
(74) *Attorney, Agent, or Firm* — Henry M. Feiereisen LLC

(57) ABSTRACT

To operate a safety load in a vehicle electric system and compensate for power surges, a vehicle electric system has a vehicle battery, an electric load, an energy storage device in form of double-layer capacitor, and a switching assembly. In a first switching state, the system can compensate for a power surge by connecting the double-layer capacitor in series with the vehicle battery with opposite polarity. The vehicle electric system also has an additional load, for example for providing functionality that is relevant for the safety of the vehicle occupants. The additional load can be supplied with a voltage present at the vehicle battery and/or with a voltage present at the electric load. A DC-to-DC converter taps an electric voltage present at the energy store and converts the tapped voltage into a supply voltage, with which the additional load can be redundantly supplied.

14 Claims, 1 Drawing Sheet

(56) References Cited

FOREIGN PATENT DOCUMENTS

| | | |
|---|---|---|
| DE | 10 2006 010 713 B4 | 4/2010 |
| DE | 10 2009 024 374 A1 | 12/2010 |
| EP | 1 035 637 A2 | 3/2000 |
| EP | 1 366 948 A1 | 12/2003 |
| WO | WO02/066293 A1 | 8/2002 |

OTHER PUBLICATIONS

Symposium „Elektrische Leistungsbordnetze and Komponenten von Strassenfahrzeugen (ELKS, electrical on-board electrical systems and components of road vehicles) 2008, articles in connection with the symposium of the same name, Oct. 8, and 9, 2008, TU Braunschweig, ISBN: 978-3-937655-17-8, p. 90.

* cited by examiner

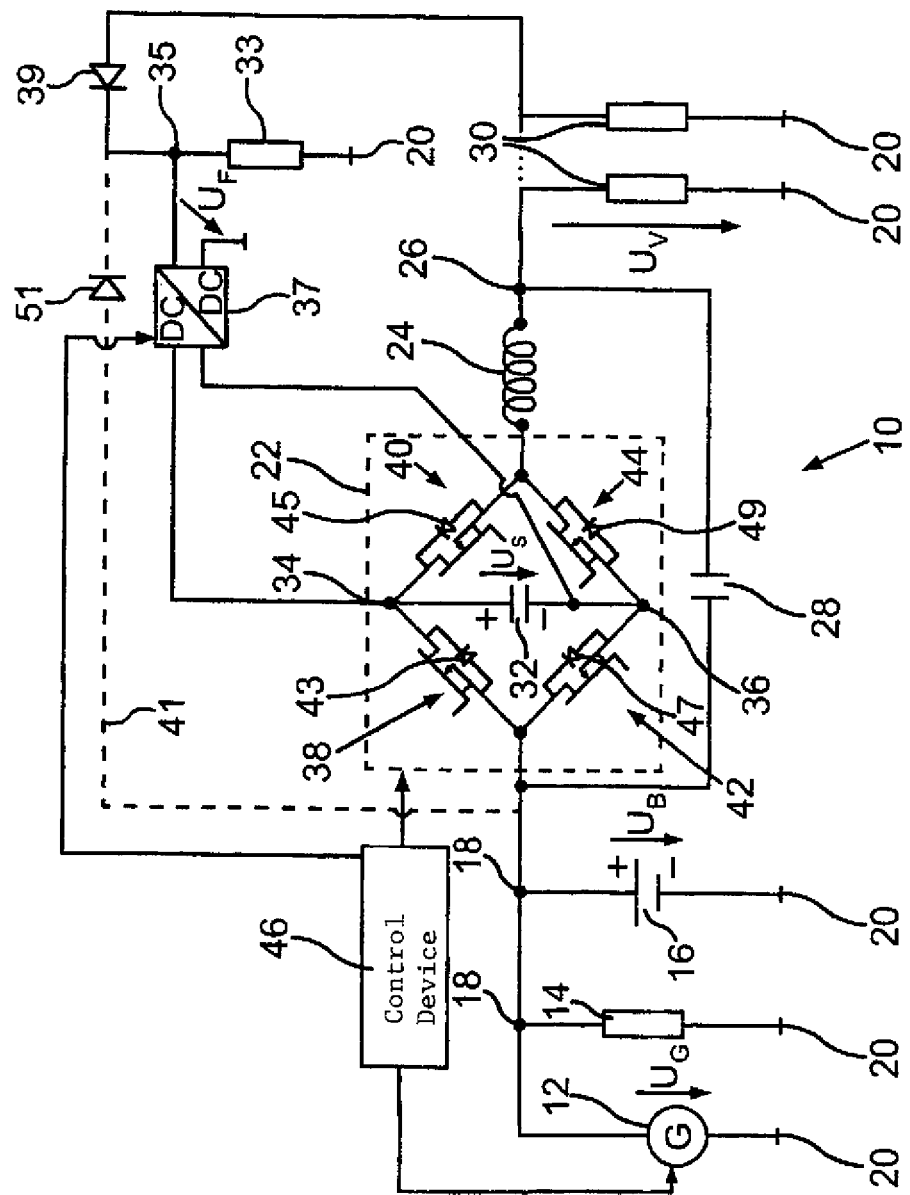

ON-BOARD ELECTRICAL SYSTEM FOR A MOTOR VEHICLE, MOTOR VEHICLE AND METHOD FOR OPERATING AN ON-BOARD ELECTRICAL SYSTEM

CROSS-REFERENCES TO RELATED APPLICATIONS

This application is the U.S. National Stage of International Application No. PCT/EP2011/001015, filed Mar. 2, 2011, which designated the U.S. and has been published as International Publication No. WO 2011/147493 and which claims the priority of German Patent Application, Ser. No. 10 2010 021 403.5, filed May 25, 2010, pursuant to 35 U.S.C. 119(a)-(d).

BACKGROUND OF THE INVENTION

The invention relates to an on-board electrical system for a motor vehicle. The on-board electrical system includes a vehicle battery, an electrical load, and an energy storage device having a positive and a negative terminal. Switching arrangement are provided which connect in a first switching state the positive terminal of the energy storage device to the vehicle battery and the negative terminal of the energy storage device to the electrical load and which can be brought into at least one additional switching state that is different from the first switching state. A control device can switch the switching arrangement between the first switching state and the additional switching state. The invention also relates to a motor vehicle with on-board electrical system of this type and a method for operating an on-board electrical system of a motor vehicle.

Electrical loads providing functions relevant for the safety of vehicle occupants are nowadays increasingly used in motor vehicles. Such safety-relevant loads typically consume a large amount of power, but require overall little energy. Such electrical loads are used as replacement for mechanical or hydraulic systems to lower the fuel consumption while improving functionality. The loads are primarily electric motors employed, for example, for the steering system, a parking lock for a parking brake, or in a braking system (for example, the ESP, the "Electronic Stability Program"). The loads may also be electronic devices, such as communication devices (such as mobile phones) for making an emergency call. On one hand, the electrical supply for these loads must always be assured; on the other hand, the current consumption of the electrical load is not constant, since they are switched on only when needed, and may therefore impair the operation of sensitive load of the on-board electrical system.

The on-board electrical system of a motor vehicle includes in the simplest case a vehicle battery, a generator and a plurality of (sensitive) loads. With the engine running, the generator provides a voltage for supplying the loads and charging the vehicle battery. The output power from the generator can also be adjusted by a controller to the respective instantaneous power requirement of the electrical loads. However, the novel electrical (safety-relevant) loads stress the on-board electrical system with high pulsed currents. Currently used generators are too slow to provide these pulsed currents or to rapidly increase or decrease the voltage. The on-board system voltage is therefore mainly stabilized by the vehicle battery, with the stability of the on-board system voltage being determined by the internal resistance of the vehicle battery. Under high pulsed currents, the on-board system voltage can collapse by several volts, thus temporarily disturbing the function of sensitive loads. Such behavior is particularly problematic with the new start-/stop-systems employed in motor vehicles.

Different systems have been developed in the past to reduce voltage drops and to protect sensitive loads. Most of these systems use double-layer capacitors or batteries as an additional energy storage device for the on-board electrical system. In many existing systems, the additional energy storage device is connected in parallel with the vehicle battery; this parallel connection reduces the total impedance and hence also the voltage drop of the on-board system. Such electrical systems are known, for example, from the documents DE 10 2005 015 995 A1 and DE 10 2007 026 164 A1.

An additional energy storage device can also be connected via an intermediate DC-DC converter, as described in the publications WO 02/066293 A1 and DE 198 59 036 A1.

It is known to supply the sensitive loads directly from the additional energy storage device, thereby decoupling the sensitive loads from the high-power loads. Such an approach is described, for example, in Robert Bosch GmbH, "Autoelektrik, Autoelektronik, Systeme and Komponenten" (*Electric Car Circuitry, Car Electronics, Systems and Components*), $4^{th}$ Edition, Vieweg Verlag, Wiesbaden, ISBN 3-528-13872-6, page 16, FIG. 7.

Currently, there is a trend to connect an additional energy storage device, such as a double layer capacitor, in series with the vehicle battery. Such on-board electrical system is known from the document Continental, ELKS 2008-"Elektrische Leistungsbordnetze and Komponenten von Straßenfahrzeugen" (*Electrical on-board power systems and components of road vehicles*), Contributions to the first Symposium with the same name on Oct. 8 and 9, 2008, TU Braunschweig, ISBN: 978-3-937655-17-8, page 90. In this on-board electrical system, the voltage drop at an engine start is compensated by connecting a double layer capacitor in series with the vehicle battery. In an ideal situation, this series circuit may provide a voltage greater than the battery voltage to the load, when the starter is not actuated. A low voltage is thereby compensated. A series connection of a car battery and a double layer capacitor is also known from the published application DE 10 2005 042 154 A1.

The present state of the art is generally concerned with the problem of compensating voltage drops in the on-board electrical system. It is a particular challenge to not only compensate the voltage drops without adding complexity, in particular without using an expensive DC-DC converter, but to also prevent overvoltages in the on-board electrical system. One remedy is an on-board electrical system of the type disclosed in DE 10 2009 024 374 A which was published after the filing date of the present application. This on-board electrical system includes switching arrangement configured to connect the positive terminal of an energy storage device to the vehicle battery and the negative terminal of this energy storage device to an electrical load. Thus, a voltage dependent on the electrical loads may be supplied to the electrical load, which is lower than the electrical voltage applied to the vehicle battery, which may be a battery voltage or a generator voltage of a generator connected in parallel with the battery. This lower voltage is attained with the additional energy storage device, for example with a double layer capacitor (also known under the name of Super-Cap), i.e. without using an expensive DC-DC converter. With this known on-board electrical system, an overvoltage at the electrical load can advantageously be compensated, especially when a generator is connected in parallel with the battery. Such an overvoltage may arise, for example, when a high-power electrical load connected in parallel with the vehicle battery is switched off.

This produces a voltage in the on-board electrical system, which is larger than the voltage produced by the generator in normal operation. When such an overvoltage is produced, the generator alone is not able to compensate the overvoltage fast enough.

When a reliable operation of the sensitive loads is guaranteed by the solution proposed in DE 10 2009 024 374 A, the attention shifts to a reliably supply of electrical energy to those loads whose functions are relevant for the safety of vehicle occupants. Such loads require at least two separate or redundant sources of energy, which can independently supply electric power. It must be ensured that these loads are supplied with electrical energy even when one power source fails, namely with electrical energy from the respective other energy source. An on-board electrical system with two separate systems—a primary system and a secondary system—for redundant supply of electrical energy to safety-relevant loads is already known, for example, from the published patent DE 10 2006 010 713 B4. The safety-relevant load can be supplied with electrical energy, as needed, from a vehicle battery or from a double layer capacitor. However, overvoltages occurring in this on-board electrical system cannot be compensated.

SUMMARY OF THE INVENTION

It is an object of the invention to propose an approach for ensuring a reliable operation of an additional electrical load in a specific on-board electrical system of the aforementioned type by compensating overvoltages occurring in the on-board electrical system without significant added costs.

This object is achieved with the invention by an on-board electrical system with a vehicle battery, an electric load, an energy storage device having a positive terminal and a negative terminal, a switching arrangement which connect in a first switching state the positive terminal of the energy storage device to the vehicle battery and the negative terminal of the energy storage device to the electrical load and which can be switched into at least one additional switching state that is different from the first switching state, a control device for switching the switching arrangement between the first and the additional switching state, an additional electrical load, particularly for providing a functionality that is relevant for the safety of the vehicle occupants, wherein the additional load can be supplied with an electrical voltage present at the vehicle battery and/or at the electrical load, and a DC-DC converter which is connected, on one hand, to the positive and the negative terminal of the energy storage device and, on the other hand, to the additional load, wherein the DC-DC converter taps an electrical voltage present at the energy storage device and is configured to convert the tapped voltage into a supply voltage, with which the additional load can be redundantly supplied. This object is also achieved by a motor vehicle with the aforedescribed on-board electrical system, as well as by a method for operating an on-board electrical system of a motor vehicle, wherein a voltage generating unit which supplies an electric voltage, an energy storage device and an electrical load are provided, and wherein the energy storage device is connected to the load and to the voltage generating unit for at least one predetermined first time interval, such that the voltage at the load is lower than the voltage of the voltage generating unit, wherein an additional electrical load, which is designed in particular for providing a functionality that is relevant for the safety of the vehicle occupants, is supplied with the voltage of the voltage generating unit, and wherein a DC-DC voltage converter taps a voltage provided at the energy storage device and converts the tapped voltage into a supply voltage for redundantly supplying the additional load.

Thus, the inventive on-board electrical system includes, in addition to (sensitive) electrical loads, an additional load, which preferably provides in the motor vehicle a functionality that is relevant to the safety of vehicle occupants. This additional load can be supplied with a voltage applied at the vehicle battery and/or at the (first) electrical load. The additional load can thus be supplied with electrical energy substantially from the vehicle battery. A DC-DC converter is connected, on one hand, to the positive and the negative terminal of the energy storage device and, on the other hand, to the additional load. The DC-DC converter taps a voltage at the energy storage device and can convert this tapped voltage into a supply voltage, with which the additional loads can be redundantly supplied.

According to the invention, the energy storage device thus assumes in the on-board electrical system two different functions: on one hand, the energy storage device can be used to compensate overvoltages, namely when its positive terminal is connected to the positive terminal of the vehicle battery and its negative terminal is connected to the electrical load; on the other hand, the energy storage device provides a redundant energy source for the additional load. A single energy storage device (in addition to the vehicle battery) is hence adequate for the on-board electrical system according to the invention for stabilizing the electric voltage, as well as for supplying redundant power to the additional load. The on-board electrical system can thus be constructed in compact form and is very cost-effective compared to conventional systems.

The redundant energy supply of the additional load is made possible by use of the DC-DC converter which can convert the voltage provided at the energy storage device into a supply voltage, with which the load can be supplied as needed. Preferably, the DC-DC converter provides the supply voltage only in an emergency situation, in particular when the vehicle battery fails or when the vehicle battery is fully discharged. The DC-DC converter is therefore preferably not operated at all in a normal operating mode of the on-board electrical system and is therefore only briefly overloaded. It can therefore be designed to operate with low energy—and only with high power—and can thus be manufactured at low costs.

Preferably, the load provides functionality in the vehicle that is relevant for the safety of the vehicle occupants. This is in particular an electric load that affects handling and/or the drivability of the vehicle. The load may be, for example, an electric motor, in particular for a steering system, a parking lock of a parking brake or a brake system (for example, the ESP). The load may also be an electronic device, such as a communication device (for example, a mobile phone) for making an emergency call. Preferably, the load is a high-power loads, which briefly consumes high power (at a voltage of, for example, 12 V), but overall low energy.

In principle, the additional loads may be arranged either on one side of the switching arrangement or on the other side of the switching arrangement, and may either be connected electrically in parallel with the vehicle battery and, optionally, a generator, or in parallel with the (first) electrical load. Advantageously, redundantly supplied loads may be connected to the vehicle battery via the switching arrangement, thus being arranged substantially parallel to the (first) electrical load. When the additional load is supplied with electrical voltage from the vehicle battery and/or the generator, the voltage across this load can then be stabilized, if necessary, by using the energy storage device.

A decoupling device may be connected between the redundantly supplied load and the vehicle battery and/or between the redundantly supplied load and the (first) electrical load. Such decoupling device may then prevent current flow from the redundantly supplied load to the vehicle battery and to the electrical load, respectively. The additional load can thus be reliably supplied with electrical energy from the energy storage device, without any electric current being drained from the additional load and flowing to the (first) electrical loads and/or to the vehicle battery.

A particularly cost-effective and compact decoupling device includes a diode having cathode connected to the additional load and an anode connected to the vehicle battery and/or to the (first) electrical load. Current flow from the additional load or from the DC-DC converter to the (first) electrical load and/or to the vehicle battery is then safely blocked.

As already stated, the additional load may briefly consume high power. The additional load may be designed to operate at a voltage with an amplitude having values ranging from 10.8 V to 17 V, in particular the nominal voltage of the vehicle battery. Accordingly, the DC-DC converter may include a step-up transformer. Such step-up transformer may supply to the additional load the supply voltage with an amplitude that is greater than the amplitude of the voltage tapped at the energy storage device and more particularly equal to the nominal voltage of the vehicle battery. The operation of the additional load is then ensured even with a fully discharged vehicle battery.

Thus, the additional load may be supplied with electrical energy from the energy storage device only in an emergency, namely when the vehicle battery is fully discharged or has otherwise failed. The control device may recognize a discharged state of the vehicle battery and then move the switching arrangement to a switching state in which the energy storage device is electrically disconnected both from the vehicle battery and from the electrical load. The total energy stored in the energy storage device is then available only to the additional load, and this load can be placed into operation.

Embodiments relating to the design of the switching arrangement, as well as relating to the compensation of overvoltages and undervoltages in the on-board electrical system will described below in more detail:

In one embodiment, the switching arrangement may in a second switching state connect the vehicle battery to the electrical load. The energy storage device is then bypassed, and the same electrical voltage is then present at the electrical load—and possibly also at the additional load—as at the vehicle battery. This second switching state of the switching arrangement may be provided in normal operation of the on-board electrical system, wherein the electrical load is directly connected to the vehicle battery—and preferably also to a generator connected in parallel with the vehicle battery. For example, when an overvoltage occurs in the on-board electrical system, the switching arrangement can be switched from the second switching state into the first switching state, and the overvoltage can be compensated.

The control device may supply through appropriate control of the switching arrangement an electrical voltage at the electrical load—and possibly also at the additional load—with an average value in a range from $U_B$–$U_S$ to $U_B$, wherein $U_B$ designates a voltage at the vehicle battery voltage—either the generator voltage or the battery voltage—and $U_S$ a voltage provided by the energy storage device. With this design, for example, the control device may alternately switch the switching arrangement at a predetermined frequency between the first switching state and the second switching state. The voltage at the electrical load can be adjusted to any average value in the abovementioned value range by appropriate selection of the ratio of the time during which the energy storage device is connected between the vehicle battery and the electrical load, and the time during which the energy storage device is bypassed. Any overvoltage, either a low or a high overvoltage, can thus be compensated. Only the average value needs to be adjusted. This can be realized, for example, by way of the following process flow: The electrical load is assumed to be a sensitive load, for example, a radio. An electric motor of a steering system—representing a high-power load—and a generator are connected in parallel with the vehicle battery. The driver of the motor vehicle first drives straight ahead, so that the electric motor is not operated. During this time, the vehicle battery and the generator connected in parallel are connected directly to the radio, i.e., the energy storage device is bypassed. The control device controls in normal operation the generator so as to supply an on-board supply voltage of, for example, 14.5 volts. The driver then steers the vehicle to the left, and the electric motor of the steering system begins to operate. During operation of the electric motor, the generator increases the on-board system voltage to prevent it from deviating from the value of 14.5 volts. When the steering maneuver is completed, the electric motor is switched off, and the on-board system voltage increases to, for example, 17 volts. The generator is too slow to quickly compensate this overvoltage. The control device then switches the switching arrangement alternately between the first and second switching state, so that the on-board system voltage is reduced back to 14.5 volts by the energy storage device. The switching arrangement is thus alternately switched between the first and the second switching state, so that the energy storage device—which can provide a maximum voltage of for example 5 volts—supplies a voltage with an average of −2.5 volts. This ensures that the on-board system voltage is adjusted to 14.5 volts even after the drive motor is turned off.

In a third switching state, the switching arrangement may connect the positive terminal of the energy storage device to the electrical load—and optionally also to the additional load—and the negative terminal of the energy storage device to the vehicle battery. A voltage greater than the voltage that is present at the vehicle battery voltage can then be attained. This embodiment is used to compensate voltage drops—resulting in the electrical system, for example, when a high-power load is connected. In particular, an undervoltage can be quickly compensated by placing the switching arrangement in the third switching state, when a generator is connected in parallel with the vehicle battery. A generator alone is too slow to quickly compensate voltage drops caused by high-performance loads. Sensitive electrical loads are typically switched off only when the vehicle power supply voltage drops below 10.8 volts. A particular advantage of this embodiment is that disconnection of sensitive loads can be avoided in the event of a voltage drop. In this embodiment, the switching arrangement can then be switched at least between the first switching state in which the positive terminal of the energy storage device is connected to the vehicle battery, and the third switching state in which the polarity of the energy storage device is reversed. Such a combination allows the compensation of both an overvoltage and an undervoltage in the on-board electrical system. With the additional second switching state in which the energy storage device is bypassed, the voltage at the electrical load can be adjusted to any value in a range from $U_B$–$U_S$ to $U_B$+$U_S$.

The third switching state of the switching arrangement may also be used in conjunction with the first switching state to pre-heat the energy storage device to a predetermined temperature when the on-board electrical system is started up and/or when the on-board electrical system transitions from one operating state to another operating state. For example, the switching arrangement may be alternately switched between the first and the third switching state during a pre-heating phase of the energy storage device and/or during a transition from one operating state to another operating state. The energy storage device is then repeatedly charged and discharged again, until it is heated to a certain temperature.

Through control of the switching arrangement, the controller can provide an electrical voltage across the electrical load with an average value in a range from $U_B$ to $U_B+U_S$. This may be achieved, for example, in that the control device switches the switching arrangement alternately between the third switching state, in which the positive terminal of the energy storage device is connected to the load, and the second switching state, in which the energy storage device is bypassed.

Any voltage drop in the on-board electrical system can thus be compensated by suitably switching the switching arrangement, for example, in the following manner: the driver drives with the motor vehicle straight ahead. During this time, an electric motor of a braking system—which is connected in parallel with the vehicle battery—remains switched off. The control device regulates the on-board system voltage produced by the generator to 14.5 volts. The driver now applies the brake of the motor vehicle. The drive motor in the braking system is activated, and the on-board electrical system voltage collapses at the beginning of this maneuver, namely, for example, to 12 volts. Since the generator alone is too slow to rapidly compensate this voltage drop, the control device switches the switching arrangement alternately between the second and the third switching state, so that the system voltage is again adjusted to 14.5 volts. The voltage of the energy storage device—for example 5 volts—is thus added periodically to the generator voltage of 12 volts, thereby providing a voltage at the electrical load with an average value of 14.5 volts by appropriate switching of the switching arrangement. The operation of sensitive loads is thus not adversely affected.

A fourth switching state of the switching arrangement may also be provided, in which the switching arrangement disconnect the electrical load from the vehicle battery.

It has been found to be particularly advantageous to connect a low-pass filter to the switching arrangement. Such filter may have a coil connected in series with the switching arrangement, as well as a capacitor connected in parallel with the series-connection of the switching arrangement and the coil. A smoothed voltage, i.e. a DC voltage, can then be provided at the electrical load. The amplitude of this DC voltage corresponds to the average value of the sum of the voltage applied at the battery voltage and the voltage provided by the energy storage device.

A generator may be connected in parallel with the vehicle battery. The parallel circuit of the vehicle battery and the generator can then be connected to the electrical load via the switching arrangement. The voltage at the electrical loads can then be stabilized through appropriate control of the switching arrangement by connecting and disconnecting a high-power load in parallel with the generator.

When a generator for generating a generator voltage is connected in parallel with the vehicle battery, the control device may control the switching arrangement depending on the respective instantaneous value of the generator voltage. The control device may, for example, control the voltage applied to the electrical load to a desired value, namely through appropriate control of the switching arrangement. When the generator voltage drops, the controller can compensate this voltage drop by additionally connecting the energy storage device. An overvoltage at the generator can also be compensated through appropriate control of the switching arrangement—as discussed above.

In one embodiment, wherein a generator for generating a generator voltage is connected in parallel to the vehicle battery and the control device adjusts the generator voltage in normal operation to a first value which is greater than the nominal voltage of the vehicle battery, the control device increases in regeneration operation the generator voltage to a predetermined second value which is greater than the first value. In regeneration operation, the generator voltage is thus set significantly higher than the nominal voltage of the vehicle battery. In regeneration mode, the acid layer formed during the lifetime of vehicle battery is removed by gas bubble agitation, thereby increasing the effective capacity of the vehicle battery. The internal resistance the vehicle battery also decreases in regeneration mode. The crystal size of the deposited lead sulfate can also be changed by a high voltage to the vehicle battery, so that the lead sulfate is converted from an insoluble form into a soluble form and is thus able to participate again in charging and discharging processes.

In one embodiment, in which a generator for generating a generator voltage is connected in parallel with the vehicle battery and the control device adjusts the generator voltage in normal operation to a first value which is greater than the nominal voltage of the vehicle battery, the control device increases in recuperation operation the generator voltage to a predetermined second value which is greater than the first value. In recuperation operation, the generator voltage is thus set higher than the nominal voltage of the vehicle battery. The vehicle battery can be recharged in this type of regeneration operation, wherein kinetic energy generated when braking the motor vehicle or in overrun operation is converted into electrical energy and stored in the vehicle battery. In recuperation operation, the switching arrangement are preferably placed in the second or the fourth switching state, so that the electrical load is either directly connected to the generator or disconnected from the generator. The duration of the recuperation operation is preferably less than that of the regeneration operation.

The switching arrangement may include:
- a first switch, in particular a MOSFET, via which the vehicle battery can be connected to the positive terminal of the energy storage device,
- a second switch, in particular a MOSFET, via which the electrical load can be connected to the positive terminal of the energy storage device,
- a third switch, in particular a MOSFET, via which the vehicle battery can be connected to the negative terminal of the energy storage device, and
- a fourth switch, in particular a MOSFET, via which the electrical load can be connected to the negative terminal of the energy storage device.

By using MOSFETs, high switching frequencies can be achieved when the polarity of the energy storage device is reversed, which cannot be achieved with conventional relays. Preferably, MOSFETs without the parasitic diode are used. Such MOSFETs have recently become commercially available. By using such MOSFET, the load and the vehicle battery can be completely decoupled. However, conventional MOSFETs with parasitic diodes may also be used.

With switching arrangement using conventional MOSFETs:

a cathode of a parasitic diode of the first MOSFET may be connected to the positive terminal of the energy storage device, and an anode of this diode may be connected to the vehicle battery, a cathode of a parasitic diode of the second MOSFET may be connected to the positive terminal of the energy storage device, and an anode of this diode may be connected to the electrical load, an anode of a parasitic diode of the third MOSFET may be connected to the negative terminal of the energy storage device, and a cathode of this diode may be connected to the vehicle battery, and an anode of a parasitic diode of the third MOSFET may be connected to the negative terminal of the energy storage, and a cathode of this diode may be connected to the electrical load.

The invention also relates to a motor vehicle having such an on-board electrical system.

The inventive method is used for operating an on-board electrical system of a motor vehicle. A voltage generating unit (for example, a vehicle battery or a generator) which provides an electrical voltage, an energy storage device (such as a double layer capacitor) and an electrical load are provided. According the method, the energy storage device is connected to the load and the voltage generating unit during at least a predetermined first time interval, such that the voltage at the load is lower than the voltage of the power generating unit. The voltage generating unit supplies the voltage to an additional electrical load—in particular a load providing a functionality that is relevant for the safety of the passengers. A DC-DC converter taps a voltage supplied at the energy storage device and converts the voltage into a power supply voltage for redundantly supplying power to the additional loads.

BRIEF DESCRIPTION OF THE DRAWING

The invention will now be explained in more detail with reference to a preferred exemplary embodiment, as well as with reference to the drawing, wherein the only FIGURE illustrates an on-board electrical system of a motor vehicle according to an embodiment of the present invention.

DETAILED DESCRIPTION OF PREFERRED EMBODIMENTS

An on-board electrical system 10 illustrated in the FIGURE includes a generator 12, a high-power load 14 connected in parallel with the generator 12—for example, a starter motor for an internal combustion engine—and a vehicle battery 16 connected in parallel with the generator 12. The vehicle battery 16 is a hydrocyanic acid battery. The generator 12, the high-power load 14 and the vehicle battery 16 are connected between a primary pole 18 and a reference potential 20. The vehicle battery 16 has, for example, to a nominal voltage of about 12 volts.

The primary pole 18 is connected via switching arrangement 22 and via a coil 24 with a secondary pole 26. A capacitor 28 is connected in parallel with the series circuit formed of the switching arrangement 22 and the coil 24. The coil 24 and the capacitor 28 form a low-pass filter. The inductance of the coil 24 may, for example, be in a range of µH. The capacitance of the capacitor 28 is, for example, 10 µF.

A plurality of sensitive electrical loads 30 are connected between the secondary pole 26 and the reference potential 20. The loads 30 may be, for example, a radio, a headlight, an electric motor for a windshield wiper and the like. An electrical voltage between the secondary pole 26 and the reference potential 20, i.e. the loads 30, is referred to as on-board system voltage $U_V$.

A generator voltage $U_G$ is present at the generator 12, and the battery voltage $U_B$ is present at vehicle battery 16. Due to the parallel circuit: $U_G=U_B$.

The on-board electrical system 10 includes a double layer capacitor 32 as an energy storage device, which has a positive terminal 34 and a negative terminal 36.

The switching arrangement 22 include a first, a second, a third and a fourth electrical switch 38, 40, 42, 44, which are constructed as MOSFETs. The positive terminal 34 of the double layer capacitor 32 can be connected via the first switch 38 with the primary pole 18 and via the second switch 40 and the coil 24 with the secondary pole 26. Likewise, the negative terminal 36 of the double layer capacitor 32 can be connected via the third switch 42 with the primary pole 18 and via the fourth switch 44 with the coil 24. The cathode of a parasitic diode 43 of the first switch 38 is connected to the positive terminal 34 of the double layer capacitor 32, whereas its anode is connected to the primary pole 18. The cathode of a parasitic diode 45 of the second switch 40 is also connected to the positive terminal 34 of the double layer capacitor 32, whereas its anode is connected to the secondary pole 26. The cathode of a parasitic diode 47 of the third switch 42 is connected to the primary pole 18, whereas its anode is connected to the negative terminal 36 of the double layer capacitor 32. Lastly, the cathode of a parasitic diode 49 of the fourth switch 44 is connected to the secondary pole 26, whereas its anode is connected to the negative terminal 36 of the double layer capacitor 32.

An electric voltage $U_S$ is present at the double layer capacitor 32.

An additional load 33, which provides in the motor vehicle a functionality that is relevant for the safety of the vehicle occupants, is also disposed in the on-board electrical system 10. The additional load 33 is hereinafter referred to as safety-relevant load 33. The safety-relevant load 33 may be an electric motor for an electrically controllable parking brake or a steering device of the motor vehicle or a mobile phone for placing an emergency call. The safety-relevant load 33 is a high-performance load, which briefly consumes high power, but low overall energy. The safety-relevant load 33 is connected, on one hand, to the reference potential 20 and, on the other hand, to a node 35.

An input side of a unidirectional DC-DC converter 37 is connected both to the positive terminal 34 and the negative terminal 36 of double layer capacitor 32. The output side of the DC-DC converter 37 is connected to the node 35—i.e. to the safety-relevant load 33—as well as to the reference potential 20. The DC-DC converter 37 taps the voltage drop $U_S$ across the double layer capacitor 32 and converts it into a power supply voltage $U_F$, which is present between the node 35 and the reference potential 20, i.e. at the safety-relevant load 33. The DC-DC converter 37 is a step-up transformer configured to transform the voltage $U_S$ into the voltage $U_F$. The amplitude of the supply voltage $U_F$ is, for example, 12 V.

The safety-relevant load 33 and the node 35, respectively, are also connected to the secondary pole 26, namely via a diode 39, which is a decoupling device. The cathode of this diode 39 is connected to the node 35, whereas its anode is connected to the secondary pole 26.

Alternatively, the nodes 35 and the safety-relevant load 33, respectively, may also be connected to the primary pole 18, as shown in the FIGURE by a dashed line 41. A diode 51 can then be used as a decoupling device, wherein the cathode of the diode 51 is connected to the node 35 and its anode is connected to the primary pole 18.

A control device 46 is provided which controls the switching arrangement 22 and the DC-DC converter 37 and which regulates the generator voltage $U_G$.

In a first switching state of the switching arrangement 22, the first and fourth switches 38, 44 are closed, so that the positive terminal of the double layer capacitor 32 is connected to the primary pole 18 and thus with the vehicle battery 16. In this first switching state, the negative terminal 36 of the double layer capacitor 32 is connected via the coil 24 to the secondary pole 26 and thus to the electrical loads 30.

In a second switching state of the switching arrangement 22, the first and the second switches 38, 40 are closed, i.e. the double layer capacitor 32 is bypassed.

In a third switching state, the second and third switches 40, 42 are closed: The positive terminal 34 is connected to the coil 24 and the negative terminal 36 is connected to the primary pole 18.

In a fourth switching state, all the switches 38, 40, 42, 44, or in pairs the first and third switch 38, 42 or the second and fourth switch 40, 44, are open. In this fourth state, the primary pole 18 is disconnected from secondary pole 26.

Possible operating states of the on-board electrical system 10, as shown in the FIGURE, will now be described:

Normal Operation:

In normal operation, the generator 12 supplies a voltage of $U_G$=14.5 volts. This voltage is slightly higher than the nominal voltage of the vehicle battery 16, so as not to stress the battery. The voltage $U_B$ present at the vehicle battery 16 is also 14.5 volts. In normal operation, the switching arrangement 22 in the second switching state: The double layer capacitor 32 is bypassed by the switches 38, 40 and/or by the switches 42, 44. This means that the on-board supply voltage $U_V$ is equal to the generator voltage $U_G$.

The safety-relevant load 33 is supplied with the on-board system voltage $U_V$ or the battery voltage $U_B$. The DC-DC converter 37 is switched off.

Emergency Operation:

The on-board electrical system 10 transitions into an emergency operation when the controller detects 46 that the vehicle battery 16 has failed, for example is fully discharged. For this purpose, a measuring device may be provided which measures the battery voltage $U_B$; the control device 46 can then ascertain, based on the detected battery voltage $U_B$, whether or not the vehicle battery 16 is fully discharged.

In the emergency mode, the controller 46 switches the switching arrangement 22 into the fourth switching state, in which the primary pole 18 is electrically isolated from the secondary pole 26. When the safety-relevant load is started up, the control device 46 controls the DC-DC converter 37 so as to generate the supply voltage $U_F$ for the safety-relevant load 33 from the voltage $U_S$. In this way, the safety-relevant load 33 is supplied with electrical energy power from the double layer capacitor 32.

Charging Operation:

In a charging operation, in which the double layer capacitor 32 is charged, the generator 12 likewise generates a voltage $U_G$=14.5 volts. In this charging operation, the switching arrangement 22 is alternately switched between the first and the second switching state. The first switch 38 then remains closed during the charging operation, whereas the second and fourth switches 40, 44 are alternately switched. To adjust the on-board system voltage $U_V$ to approximately $U_V$=$U_G$, the time period during which the second switch 40 is closed is significantly longer than the time period during which the fourth switch 44 is closed. The double layer capacitor 32 is therefore bypassed during most of the time. The DC-DC converter 37 is switched off.

Overvoltage Compensation when Load is Disconnected:

The generator voltage $U_G$ increases when the high-power load 14 or the safety-relevant load 33 is suddenly switched off. The generator voltage $U_G$ can increase, for example, from 14.5 volts to 17 volts. The generator 12 is too slow to quickly compensate for the voltage increase. In this situation, the bridge circuit including the switching arrangement 22 and the double layer capacitor 32 is helpful. When an overvoltage occurs between the primary pole 18 and the reference potential 20, the control device 46 switches the switching arrangement 22 from the second switching state in which the double layer capacitor 32 is bypassed, into the first switching state in which the positive terminal 34 of the double layer capacitor 32 is connected to the primary pole 18. In this case: $U_V$=$U_G$−$U_S$. The on-board system voltage $U_V$ is then regulated to a value of 14.5 volts. To adjust the system voltage $V_S$ to this value when using a 5 Volt—double layer capacitor 32, it may be necessary to switch the switching arrangement 22 alternately between the first and the second switching state. The on-board system voltage $U_V$ can then attain any average value. The on-board system voltage $U_V$ is then smoothed with the low pass filter including the coil 24 and the capacitor 28. The on-board system voltage $U_V$ can then be adjusted to any value in a range between $U_G$−$U_S$ and $U_G$+Us. The DC-DC converter 37 is switched off.

Undervoltage Compensation when Connecting Loads:

When the high-power load 14 or the safety-relevant load 33 are switched on, the generator voltage $U_G$ drops. For example, the generator voltage $U_G$ can drop from 14.5 volts to 12 volts. The control device 46 then switches the switching arrangement 22 from the second switching state, in which the double layer capacitor 32 is bypassed, into the third switching state in which the negative terminal 36 of the double layer capacitor 32 is connected to the primary pole 18. To regulate the on-board system voltage $U_V$ to 14.5 volts, it may be necessary to alternately switch the switching arrangement 22 between the second and the third switching state. The DC-DC converter 37 is switched off.

Regeneration Operation:

The power supply 10 can also be used to initiate a regeneration operation for the vehicle battery 16. In such an operation, the generator voltage $U_G$ is adjusted for a predetermined time interval to a value that is significantly higher than the nominal voltage of the vehicle battery 16. For example, the generator voltage $U_G$ may be adjusted to 17 volts. During the regeneration operation, the on-board system voltage $U_V$ may be regulated, for example, to 14.5 volts or the secondary pole 26 may be disconnected from the primary pole 18. When a high voltage is applied to the vehicle battery 16, the effective capacity of the vehicle battery 16 increases and the internal resistance of the vehicle battery 16 decreases. The DC-DC converter 37 is switched off.

In summary, an on-board electrical system 10 is provided in which several functions can be implemented without added complexity. Both an overvoltage and an undervoltage can be compensated with switching arrangement 22. By using only a double layer capacitor 32, on one hand, the on-board system voltage $U_V$ may be stabilized and, on the other hand, the safety-relevant load 33 may be redundantly supplied.

The invention claimed is:

1. An on-board electrical system for a motor vehicle, comprising:
   a vehicle battery;
   an electric load;

an additional electrical load configured to be supplied with a voltage present at at least one of the vehicle battery and the electrical load;

an energy storage device having a positive terminal and a negative terminal;

a switching arrangement which connects in a first switching state the positive terminal of the energy storage device to the vehicle battery and the negative terminal of the energy storage device to the electrical load and which is configured to be switched into at least one additional switching state that is different from the first switching state;

a DC-DC converter which is connected, on one hand, to the positive and the negative terminal of the energy storage device and, on the other hand, to the additional load, wherein the DC-DC converter taps a voltage present at the energy storage device and converts the tapped voltage into a supply voltage for redundantly supplying the additional load; and a control device for switching the switching arrangement between the first and the additional switching state.

2. The on-board electrical system of claim 1, wherein the additional electrical load provides functionality relevant for safety of vehicle occupants.

3. The on-board electrical system of claim 1, wherein the additional electrical load is an electric motor.

4. The on-board electrical system of claim 3, wherein the electric motor is an electric motor for a steering device or a braking system of the motor vehicle.

5. The on-board electrical system of claim 1, wherein the additional electrical load is connected to the vehicle battery by way of the switching arrangement.

6. The on-board electrical system of claim 1, further comprising a decoupling device connected between the additional electrical load and the vehicle battery or between the additional electrical load and the electrical load, with the decoupling device being configured to interrupt current flow from the additional load to the vehicle battery or from the additional electrical load to the electrical load.

7. The on-board electrical system of claim 6, wherein the decoupling device comprises a diode, with a cathode of the diode being connected to the additional electrical load and an anode of the diode being connected to the vehicle battery or the electrical load.

8. The on-board electrical system of claim 1, wherein the DC-DC converter comprises a step-up transformer, which is configured to supply to the additional electrical load the supply voltage with an amplitude that is greater than an amplitude of the tapped voltage.

9. The on-board electrical system of claim 8, wherein the supply voltage is equal to a nominal voltage of the vehicle battery.

10. The on-board electrical system of claim 1, wherein the control device is configured to switch the switching arrangement, after detecting a discharged state of the vehicle battery, into a switching state in which the energy storage device is electrically disconnected from both the vehicle battery and from the electrical load, thereby making energy stored in the energy storage device available for the additional electrical load.

11. The on-board electrical system of claim 1, wherein the switching arrangement is configured to perform at least one of the following operations:

connect in a second switching state the vehicle battery to the electrical load, so that the energy storage device is bypassed, connect in a third switching state the positive terminal of the energy storage device to the electrical load and the negative terminal of the energy storage device to the vehicle battery, and disconnect in a fourth switching state the electrical load from the vehicle battery.

12. A motor vehicle with an on-board electrical system, the on-board electrical system comprising:

a vehicle battery;

an electric load;

an additional electrical load configured to be supplied with a voltage present at at least one of the vehicle battery and the electrical load;

an energy storage device having a positive terminal and a negative terminal;

a switching arrangement which connects in a first switching state the positive terminal of the energy storage device to the vehicle battery and the negative terminal of the energy storage device to the electrical load and which is configured to be switched into at least one additional switching state that is different from the first switching state;

a DC-DC converter which is connected, on one hand, to the positive and the negative terminal of the energy storage device and, on the other hand, to the additional load, wherein the DC-DC converter taps an voltage present at the energy storage device and converts the tapped voltage into a supply voltage for redundantly supplying the additional load; and a control device for switching the switching arrangement between the first and the additional switching state.

13. A method for operating an on-board electrical system of a motor vehicle, comprising:

providing a voltage generating unit, which supplies an electric voltage, an energy storage device and an electrical load, connecting the energy storage device to the load and to the voltage generating unit for at least one predetermined first time interval, such that a voltage at the load is lower than a voltage of the voltage generating unit, supplying an additional electrical load with the voltage of the voltage generating unit, and tapping with a DC-DC converter a voltage provided at the energy storage device and converting the tapped voltage into a supply voltage for redundantly supplying the additional electrical load.

14. The method of claim 13, wherein the additional electrical load provides a functionality that is relevant for safety of vehicle occupants.

* * * * *